(12) United States Patent
Carl et al.

(10) Patent No.: US 10,678,574 B1
(45) Date of Patent: Jun. 9, 2020

(54) RECONFIGURATION RATE-CONTROL

(71) Applicant: Amazon Technologies, Inc., Seattle, WA (US)

(72) Inventors: Samuel Seung Keun Carl, Bellevue, WA (US); Amjad Hussain, Bellevue, WA (US); Upender Sandadi, Issaquah, WA (US); Anupam Shrivastava, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 15/801,141

(22) Filed: Nov. 1, 2017

(51) Int. Cl.
*G06F 11/30* (2006.01)
*G06F 9/455* (2018.01)
*G06F 11/34* (2006.01)

(52) U.S. Cl.
CPC ............ *G06F 9/455* (2013.01); *G06F 11/301* (2013.01); *G06F 11/3006* (2013.01); *G06F 11/3051* (2013.01); *G06F 11/3409* (2013.01)

(58) Field of Classification Search
CPC .............................. G06F 11/30; G06F 11/3006
USPC ........................................................ 714/47.2
See application file for complete search history.

(56) References Cited

U.S. PATENT DOCUMENTS

| | | | | |
|---|---|---|---|---|
| 8,601,375 B2* | 12/2013 | von Eicken | ............. | H04L 67/00 709/222 |
| 2006/0184653 A1* | 8/2006 | van Riel | ............... | G06F 9/5077 709/222 |
| 2007/0294669 A1* | 12/2007 | Robalewski | ........ | G06F 9/44505 717/120 |
| 2009/0249284 A1* | 10/2009 | Antosz | ...................... | G06F 8/10 717/104 |
| 2013/0179895 A1* | 7/2013 | Calder | .................. | G06F 9/5077 718/104 |
| 2014/0101299 A1* | 4/2014 | Cherel | .................... | G06F 9/468 709/223 |
| 2015/0106612 A1* | 4/2015 | Cao | ........................ | G06F 9/4401 713/2 |
| 2015/0263900 A1* | 9/2015 | Polyakov | ................ | H04L 67/10 709/203 |
| 2018/0088964 A1* | 3/2018 | Hussain | ................ | G06F 9/4405 |

* cited by examiner

*Primary Examiner* — Kamini B Patel
(74) *Attorney, Agent, or Firm* — Davis Wright Tremaine LLP

(57) ABSTRACT

A state management server applies configuration information to a set of virtual computer system instances in accordance with one or more limitations specified by an administrator. In an embodiment, the limitations include a velocity parameter that limits the number of virtual computer system instances to which the configuration may be applied concurrently. In an embodiment, the limitations include an error threshold that stops the application of the configuration if the number of configuration failures meets or exceeds the error threshold. In an embodiment, the set of virtual computer systems is identified by providing a list of the individual virtual computer system instances, or by specifying one or more tags that are associated with the virtual computer systems in the set. In an embodiment, the administrator is able to specify that an association be applied according to a predetermined schedule.

20 Claims, 10 Drawing Sheets

RECONFIGURATION RATE-CONTROL

BACKGROUND

Computing systems are used by businesses to perform various business-related tasks. As the business grows, the number and size of business-related tasks may become so large that it becomes impractical to perform the tasks using a single computer system. Therefore, some businesses distribute tasks to a collection of computer systems in a data center. In order to provide flexibility in resource management, the collection of computer systems are often implemented using a collection of virtual computer systems. The configuration of a virtual computer system is often adjusted programmatically in accordance with a resource profile. A resource profile may specify an amount of memory, a number of processing units, an amount of storage space, or other characteristics of the virtual computer system. For a large data center, managing the configuration of a large number of computer systems is an important problem as the ability to update configurations quickly is often at odds with the goal of preventing the adverse effects of errors from being too disruptive, costly, and/or otherwise significant.

BRIEF DESCRIPTION OF THE DRAWINGS

Various techniques will be described with reference to the drawings, in which.

DETAILED DESCRIPTION

Figure 1:
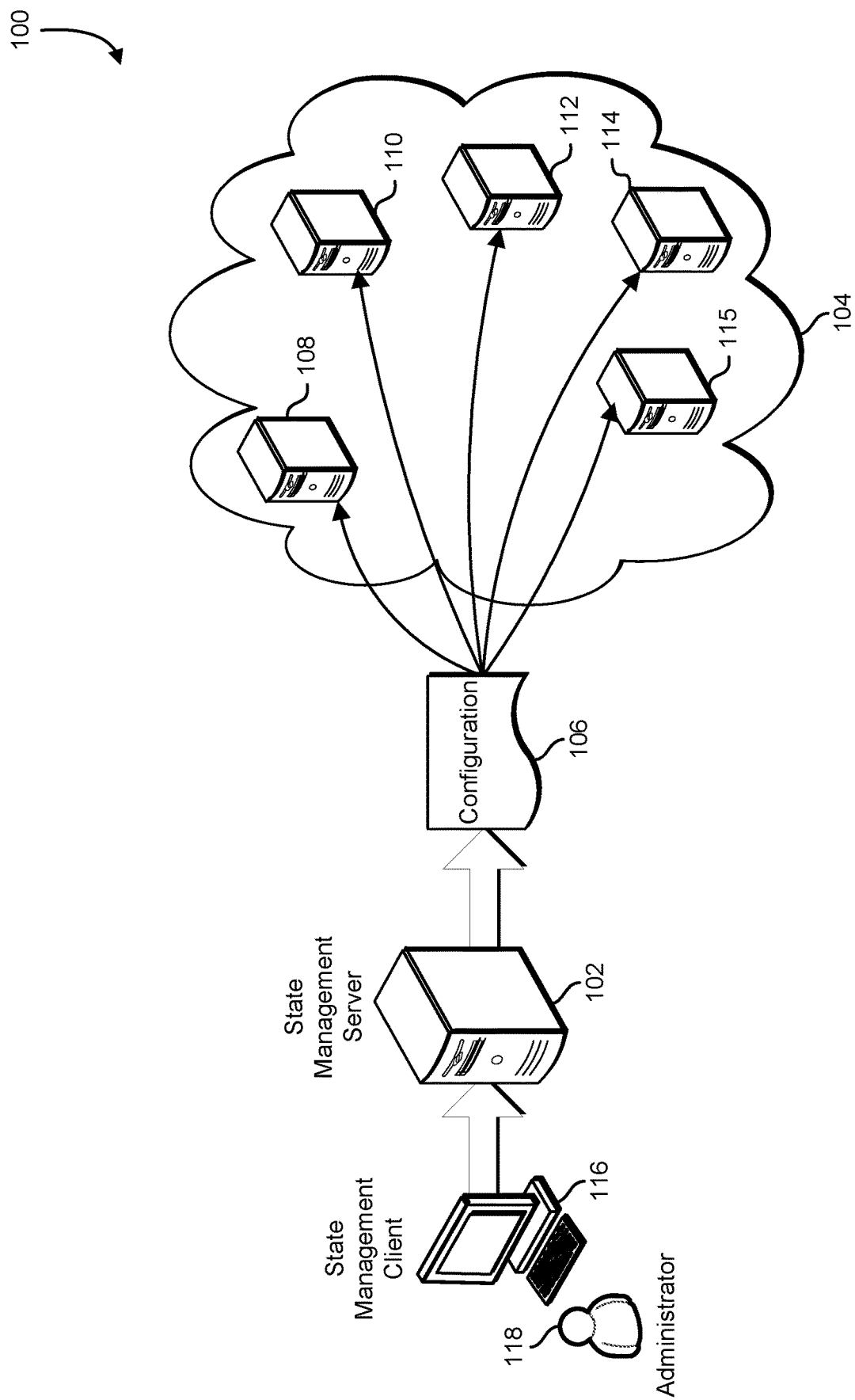
FIG. 1 shows a system in accordance with one embodiment.

The present document describes a state management server that applies configuration information to a set of computer system instances in accordance with one or more limitations specified by an owner of the configuration. In an embodiment, the limitations include a velocity parameter that limits the number of computer system instances to which the configuration may be applied concurrently. In an embodiment, the limitations include an error threshold that stops the application of the configuration if the number of configuration failures meets or exceeds the error threshold. In an embodiment, a configuration is a set of packages, updates, policies, or other settings that can be applied to a computer system or virtual computer system instance. In an embodiment, a configuration may include one or more of a revision to an installed software package, an operating system update, a set of security policy changes, or set of computing resource changes. In an embodiment, administrators use the state management server to keep their fleet of computer systems in a desired coherent state. In an embodiment, the desired state is defined by specifying an association between a configuration and a set of computer systems. In an embodiment, the set of computer systems are identified by providing a list of the individual computer system instances, or by specifying one or more tags that are associated with the computer systems in the set. In an embodiment, the administrator is able to specify that an association be applied according to a predetermined schedule. In an embodiment, the system may be used to apply configurations to a fleet of virtual computer systems.

In an embodiment, by limiting the rate at which configurations are applied to the fleet of computer systems, the system is able to provide improved availability and reliability for the fleet when configurations are being applied or updated. In an embodiment, the consequences of submitting an errant configuration to the set of computer system instances is limited by the error threshold because, once the error threshold is reached, the system stops applying the errant configuration to additional computer system instances.

In an embodiment, the state management server controls the number of concurrently applied configurations in accordance with a velocity parameter supplied by the administrator. In an embodiment, the state management server uses an external service for managing the velocity of applying configurations to individual computer system instances. In an embodiment, as results are received from individual computer system instances, the external service reports any errors to the state management server, identifies additional computer system instances to which the configuration is to be applied, and applies the configuration to the identified instances. In an embodiment, the state manager applies the configuration to the set of computer system instances repeatedly according to a schedule. In an embodiment, a scheduling service signals the state management server repeatedly, causing the state management server to reapply the configuration to the set of computer system instances.

In an embodiment, the state management server records a history of applying configurations to the set of computer system instances. In an embodiment, the history may include a list of succeeded associations and failed associations for each scheduled interval, a record of the configuration applied, and a record of the computer system instances to which the configuration was applied.

In an embodiment, the state management server is able to adapt to an administrator, adding or removing computer system instances from a set of computer system instances to which configuration is being applied. In an embodiment, if computer system instances are added to a set of computer system instances to which a configuration is being applied, the state management server associates the configuration with the additional computer system instances in due course according to the current velocity and error parameters. In an embodiment, if an administrator modifies the velocity and error parameters for an association currently being performed, the current association is stopped and a new interval is started to sign the configuration to the set of computer system instances in accordance with the new error parameters and velocity. In an embodiment, if computer system instances are removed from the set of computer system instances to which a configuration is being applied, any computer system instances removed that have not yet been processed will not be associated with the configuration. In an embodiment, if the attempt to configure the removed computer system was unsuccessful, the failed configuration is excluded from the error count when determining if the error threshold has been met.

In an embodiment, an administrator is able to define a rate-control policy that ensures that configuration changes are applied in a smarter way, honoring rate and error thresholds, while being able to adapt and adjust with new instances being added or removed from the group.

FIG. 1 shows a system in accordance with one embodiment. A diagram 100 illustrates an embodiment of a state management server 102 that associates a configuration 106 with a set of computer system instances 104. In an embodiment, the set of computer system instances 104 is a set of virtual computer system instances. The set of computer system instances 104 includes a first computer system instance 108, a second computer system instance 110, a third computer system instance 112, a fourth computer system instance 114, and a fifth computer system instance 115 In an embodiment, the configuration includes software updates, software installation packages to install, configuration settings, security settings, profile settings, or other configuration information to be applied to the set of computer system instances 104. In an embodiment, the configuration 106 may be applied to individual computer systems in the set of computer system instances 104 by installing packages, applying settings, installing software updates, setting profile or security settings, or otherwise modifying an image associated with an individual computer system or virtual computer system. In an embodiment, the set of computer system instances 104 is a set of virtual computer systems, and the configuration is applied by modifying the image of each virtual computer system in the set of virtual computer systems. In an embodiment where the configuration is applied to virtual computer systems, the configuration may include a change to the resources associated with the virtual computer system instance such as a change in memory allocation, processor allocation, or networking configuration for the virtual computer system instance.

In an embodiment, the state management server 102 is a computer system that includes one or more processors and a memory containing instructions that, if executed by the one or more processors, implement a state manager service. In an embodiment, the state manager service provides a frontend interface to the state management client 116. In an embodiment, the frontend interface is an application programming interface ("API") that is accessible to a client program running in the state management client 116. In an embodiment, state management client 116 is operated by an administrator 118. In an embodiment, the state management client 116 is a client computer system, notebook computer system, handheld device, tablet computer system, network appliance, or other device able to communicate over a network that hosts a client program. In an embodiment, the client program accesses the API of the state manager service via a network connection, such as described below. In an embodiment, the client program is a web browser and the API provided by the state manager service is a web service API.

In an embodiment, the administrator 118 uses the state management client 116 to submit a configuration and a set of parameters that control how the configuration is applied to the set of computer system instances 104. In an embodiment, the set of parameters includes a velocity parameter and an error threshold. In an embodiment, the state management server 102 applies the configuration 106 to each computer system in the set of computer system instances 104, in accordance with the set of parameters provided with the configuration. In an embodiment, the velocity parameter limits the number of computer systems to which a configuration can be concurrently applied. For example, in an embodiment, the configuration 106 is applied to the set of computer system instances 104 such that no more than a limited number of computer systems are in the process of having the configuration 106 applied at a given time. In an embodiment, as the configuration of individual computer systems is completed, additional computer systems are selected from the set of computer system instances 104 and the configuration 106 is applied to the additional computer systems. In this way, several benefits are achieved. For example, in some embodiments, the velocity parameter ensures that only a limited number of computer system instances are made unavailable while the configuration 106 is applied.

In an embodiment, the velocity parameter allows the strict enforcement of an error threshold, and the error threshold limits potential harm caused by applying an errant configuration to the set of computer system instances 104. In an embodiment, if, in the process of applying the configuration 106 to the set of client computer systems, the state management server 102 determines that the number of failed configuration applications meets or exceeds the error threshold, the state manager will stop applying the configuration 106 to additional computer system instances. In an embodiment, as the state management server 102 identifies failed configuration attempts, the velocity parameter may be reduced to ensure that the number of failed configuration applications does not exceed the error threshold. In an embodiment, the state management server 102 restricts the number of concurrently applied configurations to the lesser of either, the error threshold minus the number of errors that have already occurred, or the velocity parameter.

Figure 2:
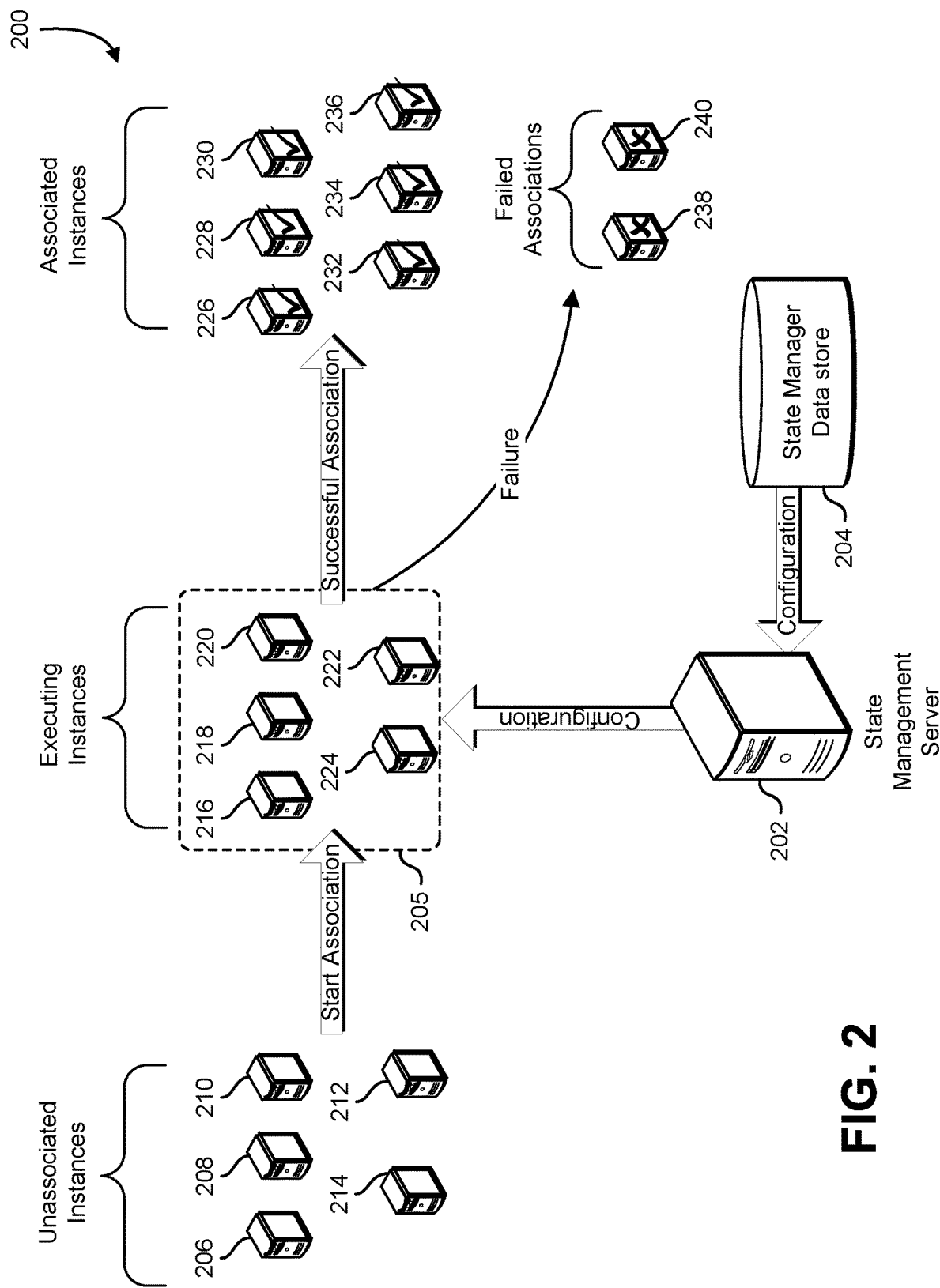
FIG. 2 shows an illustrative example of associating a configuration with a set of computer system instances in accordance with one embodiment.

FIG. 2 shows an illustrative example of associating a configuration with a set of computer system instances in accordance with one embodiment. A diagram 200 illustrates an embodiment of a process that, as a result of being performed by state management server 202, applies a configuration to a set of computer systems. In an embodiment, state management server 202 maintains a database of configurations in a state manager data store 204. In an embodiment, the state manager data store can be a storage device on the state management server 202 or an external storage device accessible to the state management server 202 via an external interface or network connection. In an embodiment, the information on the state manager data store 204 may be maintained in a relational database such as SQL server. In an embodiment, the information on the state manager data store 204 may be maintained in a NoSQL database. In an embodiment, information describing one or more sets of computer systems is maintained on the state manager data store 204.

In an embodiment, the one or more sets of computer systems are identified using tags that are applied to individual computer system instances. In an embodiment, a set of computer systems may be identified by specifying a tag, a set of tags, or a logical relationship between tags. For example, in an embodiment, various computer systems in a large group of computer systems may be tagged with an A tag, a B tag, and a C tag and particular sets of computer systems may be identified as those computer systems with the A tag and those with the B tag, but excluding those with the C tag ((A or B) and not C). In an embodiment, the state management server 202 specifies a set of computer systems by maintaining a list of computer systems in the set. In an embodiment, individual computer systems may be identified using a network name, a network address, or serial number.

In an embodiment, an administrator configures the state management server via a client computer system by defining one or more sets of computer systems and associating a configuration with each individual set. In an embodiment, the administrator specifies parameters that control how the configurations are applied across the sets by specifying one or more of a velocity parameter, an error threshold, and a scheduling interval. In an embodiment, the velocity parameter causes the state management server 202 to limit the number of computer systems that are being reconfigured at any particular time. In an embodiment, the error threshold causes the state management server 202 to stop applying configurations to computer systems when the number of configuration applications failures reaches the designated threshold. In an embodiment, the scheduling interval specifies a periodicity with which a configuration is reapplied to the set of resources. For example, in an embodiment, an administrator may specify that a particular configuration is reapplied to a set of resources every eight hours.

In an embodiment, the state management server 202 applies a designated configuration to a designated set of computer systems in accordance with the parameters specified by the administrator. In an embodiment, as the set of computer systems is being configured, four subgroups are tracked within the set of computer systems; a set of unassociated instances, a set of executing instances, a set of associated instances, and a set of failed associations. In an embodiment, the set of unassociated instances includes computer systems to which the configuration has not yet been applied by the state management server 202. In the example shown in FIG. 2, the set of unassociated instances includes computer systems labeled 206, 208, 210, 212, and 214. In an embodiment, the set of executing instances 205 includes those computer systems to which the configuration is in the process of being applied. In an embodiment, computer systems to which the configuration is currently being applied may be unavailable for use due to each computer system being in an indeterminate state. In the example illustrated in FIG. 2, the set of executing instances 205 includes computer systems labeled 216, 218, 220, 222, and 224. In an embodiment, the number of computer systems in the set of executing instances 205 is determined by a velocity parameter specified by the administrator.

In an embodiment, as the state management server 202 completes the configuration of each computer system in the set of executing instances, the completed computer systems become members of either the set of associated instances or the set of failed associations. In an embodiment, the set of associated instances comprises computer systems to which the configuration has been successfully applied by the state management server 202. In the example shown in FIG. 2, the set of associated instances includes the computer systems labeled 226, 228, 230, 232, 234, and 236. In an embodiment, the set of failed associations comprises computer systems to which the state management server 202 was unable to successfully apply the configuration. In the example shown in FIG. 2, the set of failed associations includes the computer systems labeled 238 and 240. In an embodiment, the application of the configuration to a particular computer system may fail for a variety of reasons such as the computer system being asleep, the computer system being used for other tasks, insufficient memory are processor resources being available to apply the configuration, or an incompatibility between the configuration and the current state of the computer system. In an embodiment, when the state management server 202 determines that a configuration cannot be applied to a computer system, the state management server 202 increases in error count which is checked against an error threshold specified by the administrator. In an embodiment, after the number of systems in the set of failed associations meets or exceeds the error threshold, the state management server does not apply the configuration to computer systems in the set of unassociated instances.

In an embodiment, the state management server 202 receives a repeating signal from a scheduling service indicating that application of a configuration to a set of computer systems should be performed. In an embodiment, application of the configuration to a particular computer system can be referred to as associating a particular configuration to the particular computer system. In an embodiment, the state management server 202 arranges the set of computer systems into a set of unassociated instances. In an embodiment the state management server 202 selects a number of the instances from the set of unassociated instances in accordance with a velocity parameter specified with the association being performed, and begins applying the configuration to the selected instances. In an embodiment, as application of the configuration to individual instances of the selected instances is completed, the state management server 202 selects a corresponding number of additional instances from the set of his unassociated instances and begins applying the configuration to the additional selected instances. In an embodiment, completed computer system instances either become members of the set of associated instances or failed associations. In an embodiment, the state management server 202 monitors the number of failed associations and, if the number of failed associations meets or exceeds a designated error threshold, the state management server 202 does not apply the configuration to additional computer systems in the set of unassociated instances. In an embodiment, the state management server 202 may reduce the number of computer systems in the set of executing instances by the number of failed associations to avoid overshooting the error threshold.

Figure 3:
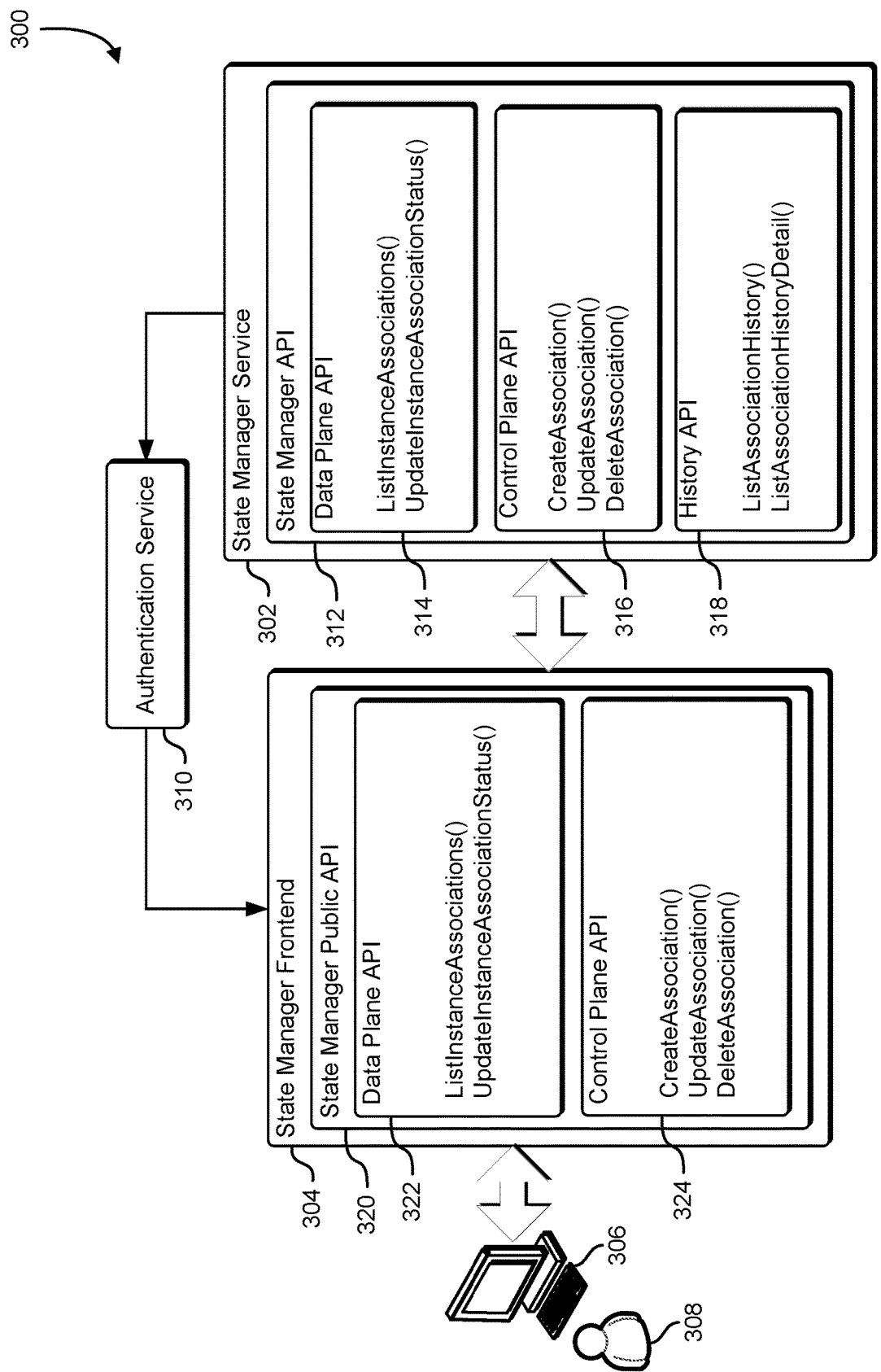
FIG. 3 shows an illustrative example of a state manager service and an associated state manager frontend interface in accordance with one embodiment.

FIG. 3 shows an illustrative example of a state manager service and an associated state manager frontend interface in accordance with one embodiment. Diagram 300 illustrates an embodiment of the state manager service 302 and a state manager frontend 304 hosted by a state management server. In an embodiment, the state manager frontend 304 and the state manager service 302 are services implemented on the state management server by way of computer executable instructions stored on a memory on the state management server. In an embodiment, the instructions implement a set of APIs when executed by a processor on the state management server.

In an embodiment, the state manager frontend 304 is accessed by an administrator 308 operating a client computer system 306. In an embodiment, the client computer system can be a personal computer system, a notebook computer system, a cellular device, a tablet computer, or a network appliance running a client computer program capable of interacting with the API exposed by the state manager frontend 304. In an embodiment, the API is a network-accessible API and the client program accesses the state manager frontend 304 via a computer network connecting the client computer system 306 to the state management server. In an embodiment, the state manager service 302 and the state manager frontend 304 use an authentication service 310 to provide authentication and authorization when performing privileged operations within the security context of the administrator. In an embodiment, the authentication service 310 also provides authentication and authorization for calls between different web services. In an embodiment, the authentication service may be part of the state manager frontend 304, and authentication may be performed by the state manager frontend 304.

In an embodiment, the state manager service 302 implements a state manager API that includes a data plane API 314, a control plane API 316, and a history API 318. In an embodiment, the data plane API 314 implements and provides access to functions that list associations between configurations and particular computer systems, and functions that update the status of associations. In an embodiment, the control plane API 316 implements and provides access to functions that create associations, update associations, and delete associations between configurations and particular computer systems. In an embodiment, the history API 318 implements and provides access to functions that list a history of associations performed and also provide specific details on particular association operations. In an embodiment, the APIs provided by the state manager service 302 are accessible to other services within the state management server including the state manager frontend 304.

The state manager frontend 304 implements a state manager public API 320 which is accessible to the client computer system 306. In an embodiment, the state manager public API 320 is implemented as a web API. In an embodiment, the state manager public API 320 includes a data plane API 322 and a control plane API 324. In an embodiment, the data plane API 322 provides an interface that is exposed to the client computer system 306 and authenticates requests using the authentication service 310. In an embodiment, the APIs exposed by the data plane API 322 correspond to API calls made available by the state manager service 302 and are implemented using corresponding API calls to the data plane API 314 of the state manager API 312. In an embodiment, the data plane API 322 implements APIs for listing instance associations and updating instance association status. In an embodiment, the control plane API 324 provides an interface that is exposed to the client computer system 306 and which authenticates requests using the authentication service 310. In an embodiment, the APIs exposed by the control plane API 324 correspond to API calls which are available from the control plane API 316 of the state manager API 312. In an embodiment, the control plane API 324 provides access to functions that create associations, update associations, and delete associations at the request of the administrator 308.

In an embodiment, the administrator 308 uses a client computer system 306 to submit a call to an API provided by the state manager public API 320. In an embodiment, the call is processed by an API of the data plane API 322 or the control plane API 324, and the API function within the data plane API 322 or the control plane API 324 cause a corresponding function in the state manager API 312. In an embodiment, the corresponding function in the data plane API 314 or the control plane API 316 performs the requested operation and returned results to the state manager public API 320, and the results are relayed to the administrator 308 by the client computer system 306.

Figure 4:
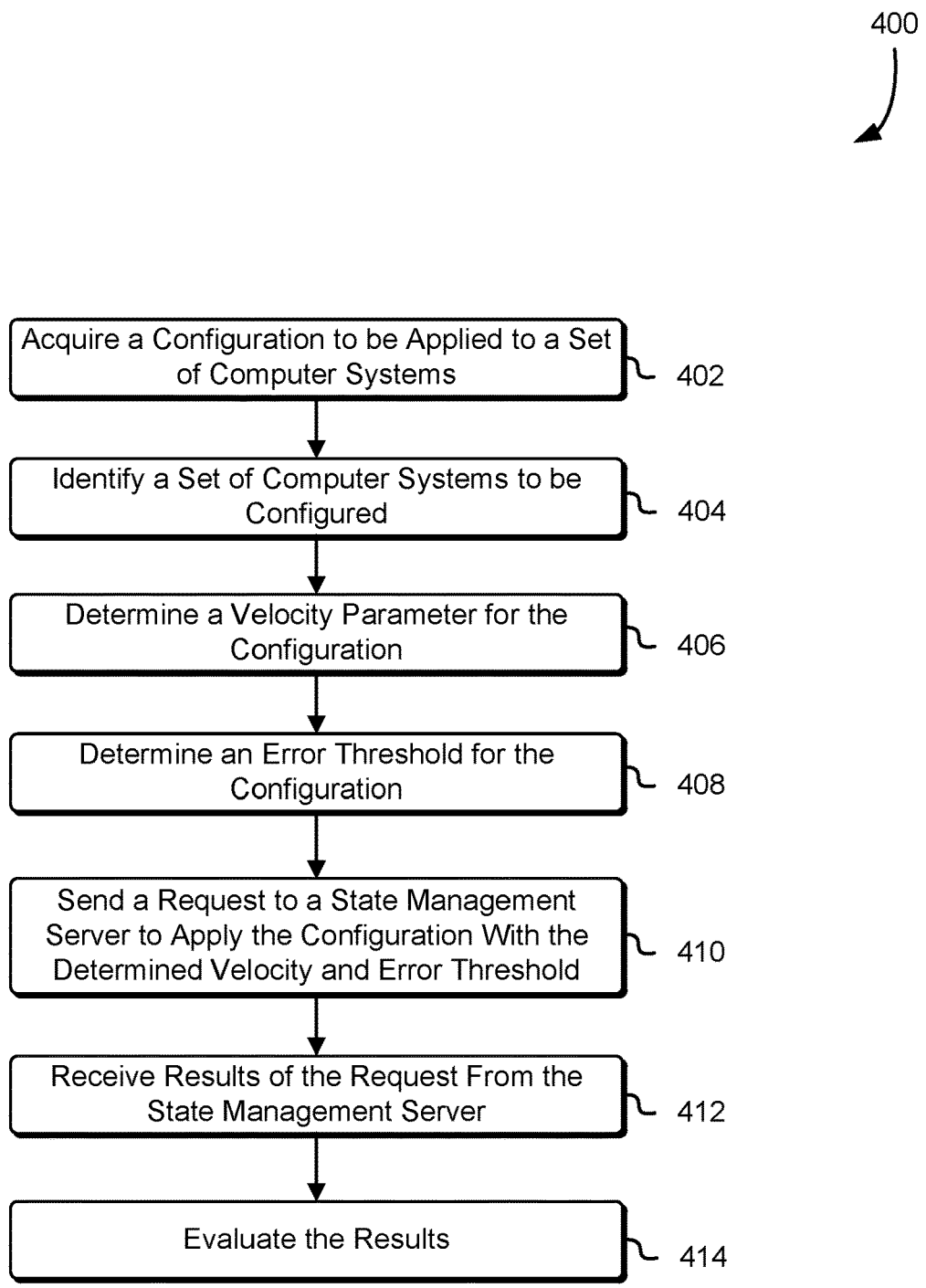
FIG. 4 shows an illustrative example of a process in accordance with one embodiment.

FIG. 4 shows an illustrative example of a process in accordance with one embodiment. A flowchart 400 illustrates an embodiment of a process that, if performed by a client computer system, submits a configuration to be associated with a set of computer system instances. The process begins at block 402 where the client computer system acquires a configuration to be applied to a set of computer systems. In an embodiment, the configuration may include software patches, profile settings, software installation packages, operating system patches, virtual machine resource profiles, security settings, security credentials such as login information, or cryptographic keys to be applied to a computer system.

In an embodiment, at block 404, the client computer system identifies a set of computer systems to be configured. The set of computer systems may include computer systems, computer servers, virtual computer systems, or client computer systems. In an embodiment, the set of computer systems is identified by the client computer system by providing a list of network addresses, system names, serial numbers, processor IDs, or other information uniquely associated with particular computer systems. In an embodiment, the system maintains a database containing identifying information for the set of computer systems that includes tags that are linked to individual computer systems. In an embodiment, the set of computer systems is identified by the client computer system providing a tag, a set of tags, or a Boolean combination of tags to the system. In an embodiment, when the tags are evaluated by the system, the tags identify a set of computer systems to be configured. In an embodiment, the set of computer systems is a set of virtual computer systems, and the database linking the virtual computer system instances to tags is maintained by a hypervisor.

In an embodiment, at block 406, the client computer system determines a velocity parameter for applying the configuration to the set of computer systems. In an embodiment, the velocity parameter is a number of computer systems to which a configuration may be concurrently applied. In an embodiment, the velocity parameter may be a percentage of the set of computer systems to which a configuration may be concurrently applied. In an embodiment, at block 408, the client computer system determines an error threshold for assigning the configuration to the set of computer systems. In an embodiment, if the system determines that a number of computer systems equal to or greater than the error threshold are unable to be properly configured, the system aborts the configuration process by not initiating additional configuration operations on the set of computer systems. In an embodiment, the error threshold may be specified as a percentage of the set of computer systems.

In an embodiment, at block 410, the client computer system sends a request to the state management server specifying the set of computer systems, the configuration to apply to the set of computer systems, the velocity parameter, and the error threshold. In an embodiment, the request is sent by calling an API provided by a state manager frontend. In an embodiment, at block 412, the client computer system receives a result of the request from the state management server and evaluates 414 the status. In an embodiment, the results identify any computer systems that were not properly configured.

Figure 5:
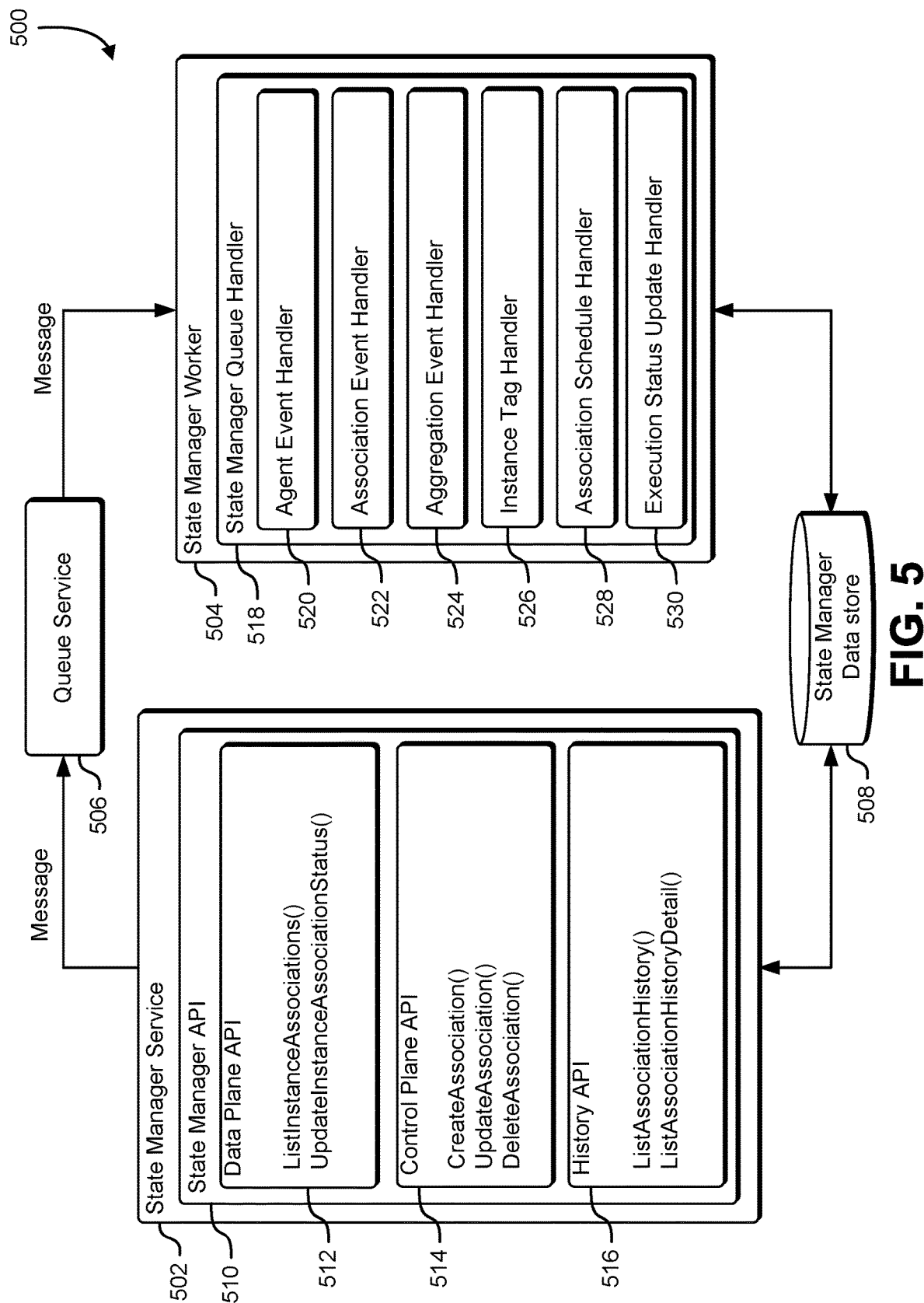
FIG. 5 shows an illustrative example of a state manager service and an associated state manager worker in accordance with one embodiment.

FIG. 5 shows an illustrative example of a state manager service and an associated state manager worker in accordance with one embodiment. A diagram 500 illustrates an embodiment of a state manager service 502 and a state manager worker 504. In an embodiment, the state manager service 502 is a set of executable instructions stored on a memory on a state management server that, when executed by a processor of the state management server, implements a set of functions for applying a configuration to a set of computer system instances. In an embodiment, the state manager worker 504 is a set of instructions in a memory on the state management server that, when executed by processor of the state management server, implement a set of functional library modules used by the state manager service 502. In an embodiment, the state manager service 502 submits work requests to the state manager worker 504 via a queue service 506. In an embodiment, the queue service 506 is service running on the state management server or another server accessible by the state management server. In an embodiment, the queue service receives messages, events, or other queue entries and retains the entries in an ordered list. In embodiment, the entries are provided on request in a first in-first-out fashion. In embodiment, the queue service 506 is implemented as a network service that is accessible to the state management server. In an embodiment, the state manager service 502 and the state manager worker 504 access information about configurations, and computer systems to be configured, that is stored in a state manager data store 508. In an embodiment, the state manager service 502 is responsible for handling requests to manage associations. In an embodiment, create, update, and delete APIs update an association table on the state manager data store 508, and send association events to the queue service 506, thereby allowing the state manager worker 504 to asynchronously process messages. In an embodiment, query APIs retrieve appropriate tables in the state manager data store 508 and return results back to the caller.

In an embodiment, the state manager service 502 implements a state manager API 510 that includes a data plane API 512, a control plane API 514, and a history API 516. In an embodiment, the data plane API 512 implements and provides access to functions that list associations between configurations and particular computer systems, and functions that update the status of associations. In an embodiment, the control plane API 514 implements and provides access to functions that create, update, and delete associations between configurations and particular computer systems. In an embodiment, the history API 516 implements and provides access to functions that list a history of associations performed and also provide specific detail on particular association operations. In an embodiment, the history API 516 maintains a history of past configuration applications. In an embodiment, the history API 516 creates an execution history record for each applied configuration. In an embodiment, the history API 516 generates a summary of each configuration request that includes a record of failed and successful configurations. In an embodiment, the APIs provided by the state manager service 502 are accessible to other services within the state management server including the state manager frontend.

In an embodiment, the state manager worker 504 retrieves messages from the queue service 506 and processes tasks associated with the retrieve messages. In an embodiment, the tasks may include tasks that expand the set of computer systems that are to be configured, tasks that evaluate instance tags to determine associations, and tasks that update association execution status and aggregate status. In an embodiment, the state manager worker 504 includes a state manager queue handler 518. In an embodiment, the state manager queue handler 518 includes an agent event handler 520, an association event handler 522, an aggregation event handler 524, an instance tag handler 526, an Association schedule handler 528, and the execution status update handler 530. In an embodiment, the state manager queue handler 518 and associated handlers are functional modules of the state manager worker 504. In embodiment, each handler is associated with a set of functional entry points supporting various functionality of the state manager service 502. In an embodiment, each handler corresponds to a set of executable instructions of the state manager worker 504.

Figure 6:
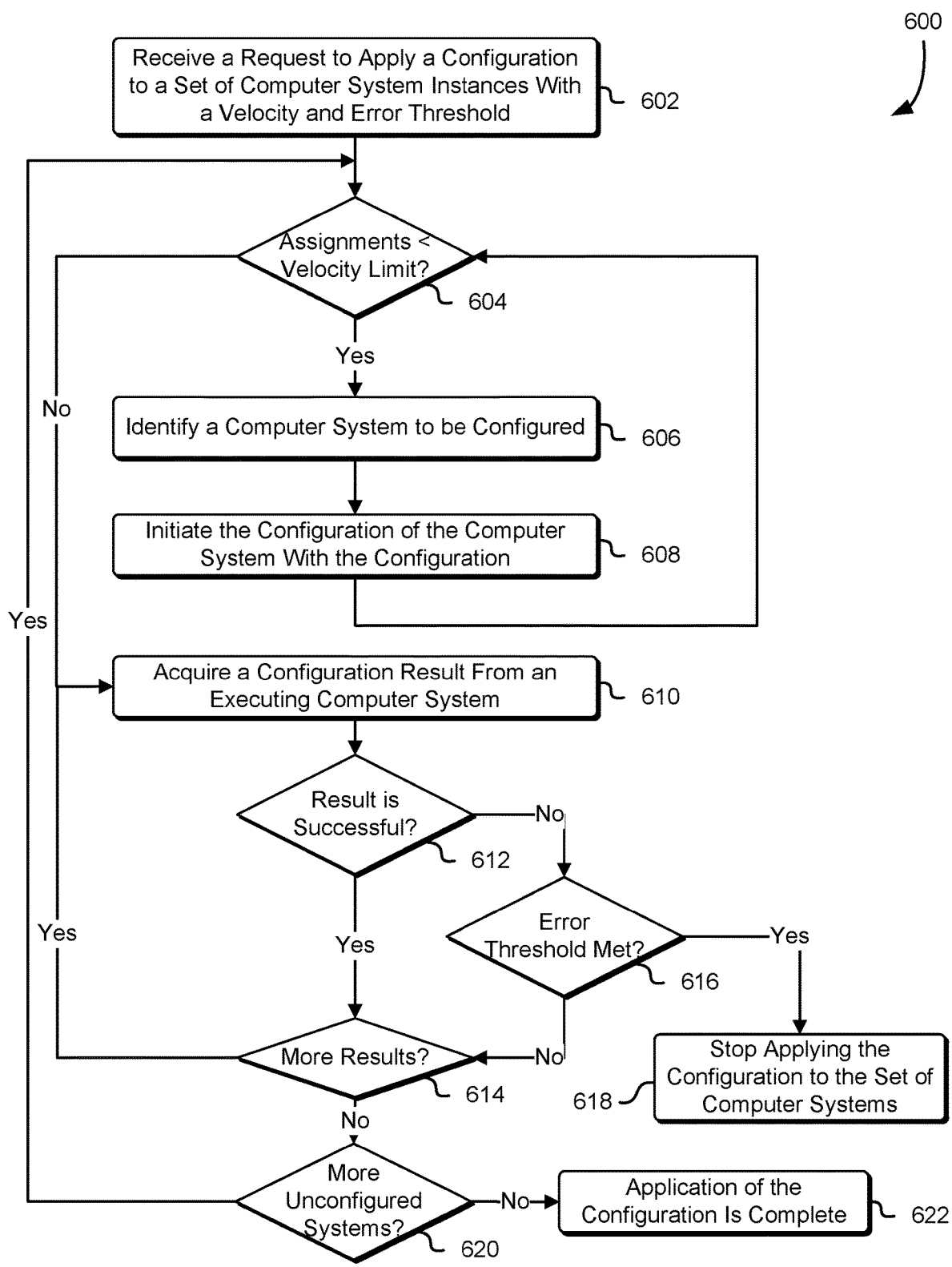
FIG. 6 shows an illustrative example of a process in accordance with one embodiment.

FIG. 6 shows an illustrative example of a process in accordance with one embodiment. A flowchart 600 illustrates an embodiment of a process that, if performed by a state management server, associates a configuration to a set of virtual computer system instances in accordance with a velocity limit and an error threshold. In an embodiment, the process begins at block 602 with the state management server receiving a request to apply a configuration to a set of computer system instances in accordance with the specified velocity and error threshold. In an embodiment, at decision block 604, the state management server examines the state of the set of computer systems and determines the number of computer systems that are in the process of being configured. If the number of computer systems that are in the process of being configured is less than a threshold number of concurrent assignments determined based at least in part on the velocity limit, execution advances to block 606. In an embodiment, at block 606, the state management server identifies a computer system to be configured from the set of computer systems that are not yet configured. In an embodiment, at block 608, the state management server initiates the application of the configuration to the computer system by, for example, launching a configuration command on a command service. After initiating the configuration of the computer system, execution returns to decision block 604. If, at decision block 604, the number of computer systems that are in the process of being configured is greater than or equal to the threshold number of concurrent assignments determined based at least in part on the velocity limit, execution bypasses blocks 606 and 608 and advances to block 610.

In an embodiment, at block 610, the state manager acquires a result of a newly completed application of the configuration. In an embodiment, configurations are performed by command service and results of the configurations are submitted by the command service to a queue service. In an embodiment, the results of the configurations are retrieved by the state management server from the queue service. In an embodiment, at decision block 612, the state manager examines the result and determines whether the configuration was successful. If the application of the configuration was successful, execution advances to decision block 614. If the application of the configuration was not successful, execution advances to decision block 616. In an embodiment, at decision block 616, the state management server updates the error count of failed configurations and compares it to the error threshold. If the error count meets or exceeds the error threshold, execution advances to block 618 and the state management server stops applying configurations to the set of computer systems. In an embodiment, if the error threshold is met or exceeded, the state management server indicates the failure of the configuration process to an administrator and identifies those computer systems for which configuration was unsuccessful, those computer systems for which configuration was incomplete, and those computer systems for which configuration was successful.

In an embodiment, at decision block 616, if the error count does not meet or exceed the error threshold, execution advances decision block 614. In an embodiment, at decision block 614, the state management server determines whether there are additional configuration results to be processed. In an embodiment, the state manager determines whether there are additional configuration results by querying the queue service for additional results. If there are additional results to be processed, execution returns to block 610 where the additional results are processed. If there are not additional results to be processed, execution advances to decision block 620. In an embodiment, at decision block 620, the state management server determines whether there are additional computer systems in the set of computer systems to which the configuration has not yet been applied. If there are additional computer systems to configure, execution returns to decision block 604.

If there are not additional computer system to configure execution proceeds to block 622. In an embodiment, at block 622, the state management server determines that application of the configuration to the set of computer systems is complete. In an embodiment, the state management server returns, to the administrator, status information that indicates the successful completion of application of the configuration. In an embodiment, the state management server identifies, to the administrator, any computer systems to which the configuration was not successfully applied.

Figure 7:
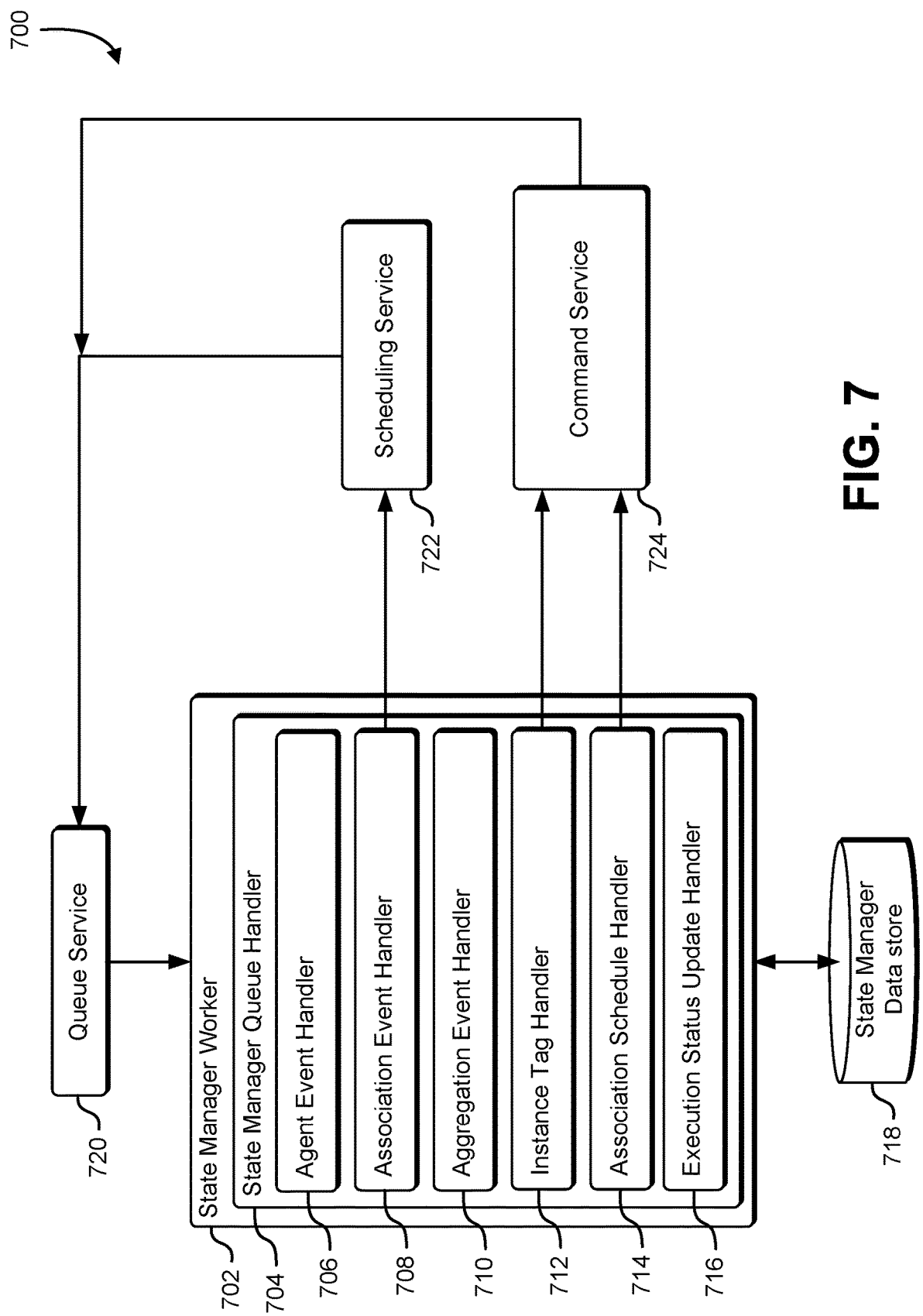
FIG. 7 shows an illustrative example of a state manager worker that operates in coordination with a scheduling service in accordance with one embodiment.

FIG. 7 shows an illustrative example of a state manager worker that operates in coordination with a scheduling service in one embodiment. In an embodiment, the state manager worker 702 includes a state manager queue handler 704. In an embodiment, the state manager queue handler 704 includes an agent event handler 706, an Association event handler 708, an aggregation event handler 710, an instance tag handler 712, an Association schedule handler 714, and an execution status update handler 716. In an embodiment, the state manager worker 702 stores information relating to the associations in a state manager data store 718. In an embodiment, the state manager data store may be a non-volatile memory, disk drive, or other storage device on a state management server that hosts the state manager worker 702. In an embodiment, the state manager worker 702 processes messages that are received via queue service 720. In an embodiment, in addition to messages received from a state manager service, the queue service 720 receives events and status from a scheduling service 722 and the command service 724. In an embodiment, the scheduling service is a service that generates signals to other computer programs based on the passage of time. In embodiment the scheduling service is implemented as software component on the state management server and uses a hardware timer on the state management server to track the passage of time. In an embodiment, for example, the scheduling service 722 may be a cron program configured by the administrator. In embodiment, the command service 724 may be implemented as a service on the state management server or on a separate server. In embodiment, the command service 724 receives instructions from the state manager worker 702, and executes the received instructions on a processor of the hosting server. In embodiment, the command service 724 may provide execution in accordance with a set of execution parameters provided by the requester.

In an embodiment, in order to control the rate at which configurations are applied to computer systems, the state manager schedules and manages the rate of execution using the scheduling service 722. In an embodiment, the scheduling service 722 is configured to send repeated signals to the state manager worker 702 via the queue service 720 that cause the state manager worker 702 to reapply the configuration to the set of computer systems. In an embodiment, each reapplication of the configuration to the set of computer systems is called an interval. In an embodiment, the rate at which configurations are applied to computer systems is controlled by the command service 724. In an embodiment, the command service 724 applies the configurations to the computer systems in accordance with the velocity parameters specified by the administrator. In an embodiment, if additional computer systems are added to the set of computer systems to which the configuration is to be applied, the state manager worker 702 sends additional commands to command service 724 to configure the additional computer systems.

In an embodiment, the state manager directs the command service 724 to perform each scheduled execution of an association, specifying the velocity parameters and error threshold. In an embodiment, if the association is created with a tag based target, the tags are passed on to the command service 724. In an embodiment, the state manager populates the instance association mapping and updates the instance association mapping status as it is receiving the command invocation status update events. In an embodiment, during the association interval, new instances can join the association targets due to new instances becoming tagged. In an embodiment, for such new instances, the state manager will send commands to the command service after the first run command status notification is received. In an embodiment, the number of configuration errors is recalculated each time a new command is executed by the command service 724. In an embodiment, the state manager relies on notifications from the command service 724 for populating the instance association mapping table in the state manager data store 718.

In an embodiment, the state manager uses the scheduling service 722 to schedule repeated applications of the configuration to a set of computer systems. For example, in an embodiment, an association may be scheduled to run every 30 minutes, targeting one instance with a maximum concurrency of one. If an association takes 40 minutes to execute in the above example, the execution of the first instance from the first interval will extend into the second interval and the second interval will be skipped by the state manager.

In an embodiment, an association is scheduled to run every 30 minutes, targeting three instances with a maximum concurrency of one. If the Association takes 45 minutes to execute for each instance, execution of the first instance from the first interval will extend into the second interval. After the first instance completes execution, the state manager will start execution on the second instance which will run into the third interval. In this embodiment, after the second instance completes execution, the state manager will stop execution of the current interval as execution spans across three intervals. In an embodiment, the state manager will record the first interval as aborted and the second and third intervals as skipped.

In an embodiment, an association is scheduled to run every 30 minutes targeting instances that are associated with a particular tag, with a maximum concurrency of one. If there is one instance with the tag and the association takes 40 minutes to execute for each instance, the execution of the instance from the first interval will extend into the second interval. If another instance comes online during the second interval, the instance will not be executed as part of first interval.

In an embodiment, an association is scheduled to run every 30 minutes targeting one instance. If the Association takes 100 minutes to execute a single instance, the execution will extend into a fourth interval as the state manager waits for the assignment to complete.

In an embodiment, the state manager worker 702 instructs the command service 724 to configure a given computer system instance. When the command service 724 completes the configuration, the command service 724 places the results of the configuration into the queue service 720. In an embodiment, the state manager worker 702 repeatedly checks the queue service 720 to determine whether configurations have been completed and submit additional commands to the command service 724 in accordance with the velocity parameter and error threshold submitted by the administrator.

Figure 8:
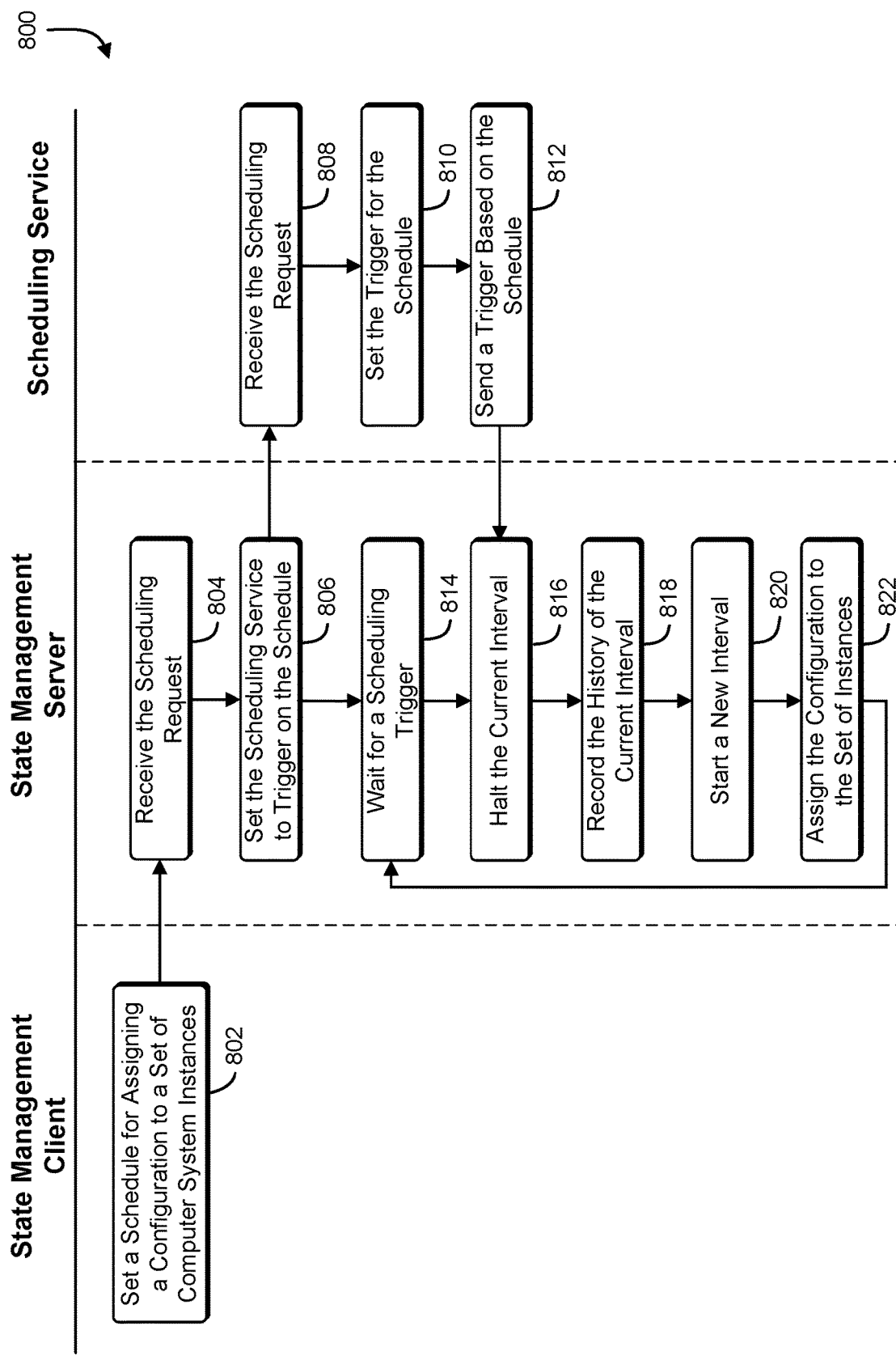
FIG. 8 shows an illustrative example of a process in accordance with one embodiment.

FIG. 8 shows an illustrative example of a process in accordance with one embodiment. A swim diagram 800 illustrates an embodiment of a process that, if performed by a state management client, a state management server, and a scheduling service, assigns a configuration to a set of virtual computer system instances in accordance with a schedule. In an embodiment, the process begins at block 802 with the state management client determining a schedule for assigning a configuration to a set of computer system instances. In an embodiment, the schedule specifies a periodicity with which the configuration is to be applied to the entire set of computer system instances, for example, applying the configuration to all of the computer systems in the set of computer system instances each day. In an embodiment, the state management client sends a request to apply the configuration to a set of computer systems in accordance with the determined schedule.

In an embodiment, at block 804, the state management server receives the scheduling request from the state management client. In an embodiment, at 806, the state management server sends a command to the scheduling service commanding the scheduling service to provide a trigger based on the schedule specified by the state management client. In an embodiment, while waiting for the scheduling service to return a schedule trigger, the state management server proceeds with applying the configuration to the set of computer systems in accordance with any velocity and air parameters provided by the state management client.

In an embodiment, the scheduling service receives the scheduling request at block 808. In an embodiment, the scheduling service sets a trigger based on the schedule 810 provided by the state management server. In an embodiment, the scheduling service maintains a timer that generates a signal repeatedly in accordance with the provided schedule. In an embodiment, the scheduling service receives a signal from the timer that causes the scheduling service to send 812 a trigger to the state management server. In an embodiment, the scheduling service will continue to send triggers to the state management server repeatedly in accordance with the schedule.

In an embodiment, the state management server waits 814 for scheduling triggers to be received from the scheduling service. In an embodiment, at block 816, the state management server receives the trigger from the scheduling service, and in response, stops applying the configuration to additional computer systems in the set of computer systems. In some embodiments, the state management server allows the current interval to proceed if not all computer systems in the set of computer systems have been processed. In an embodiment, the state management server continues the current interval for up to a threshold number of triggers before aborting the current interval. In an embodiment, the maximum number of triggers may be specified by an administrator with the request, or configured by an administrator of the state management server. In an embodiment, if the current interval is not aborted, execution returns to block 814 and the state management server waits for an additional scheduling trigger. If the current interval is aborted due to the number of allowable trigger events being exceeded, execution advances to block 818.

In an embodiment, at block 818, the state management server records the results of the interval and the history record. In an embodiment, the history record includes a record of how many trigger events were required to complete the interval, whether the interval was completed, a record of any computer systems that were not successfully configured, and a record of any computer systems that were not configured.

In an embodiment, the state management server begins a new interval by resetting the interval parameters at block 820. In an embodiment, processing of the new interval is initiated by beginning to reapply the configuration to the set of computer systems at block 822. In an embodiment, as the configuration is being applied to the set of computer systems, the state management server waits for another scheduling trigger at block 814. In an embodiment, the above process allows the state management server to repeatedly reapply the configuration to the set of computer systems in accordance with the schedule provided by the state management client.

Figure 9:
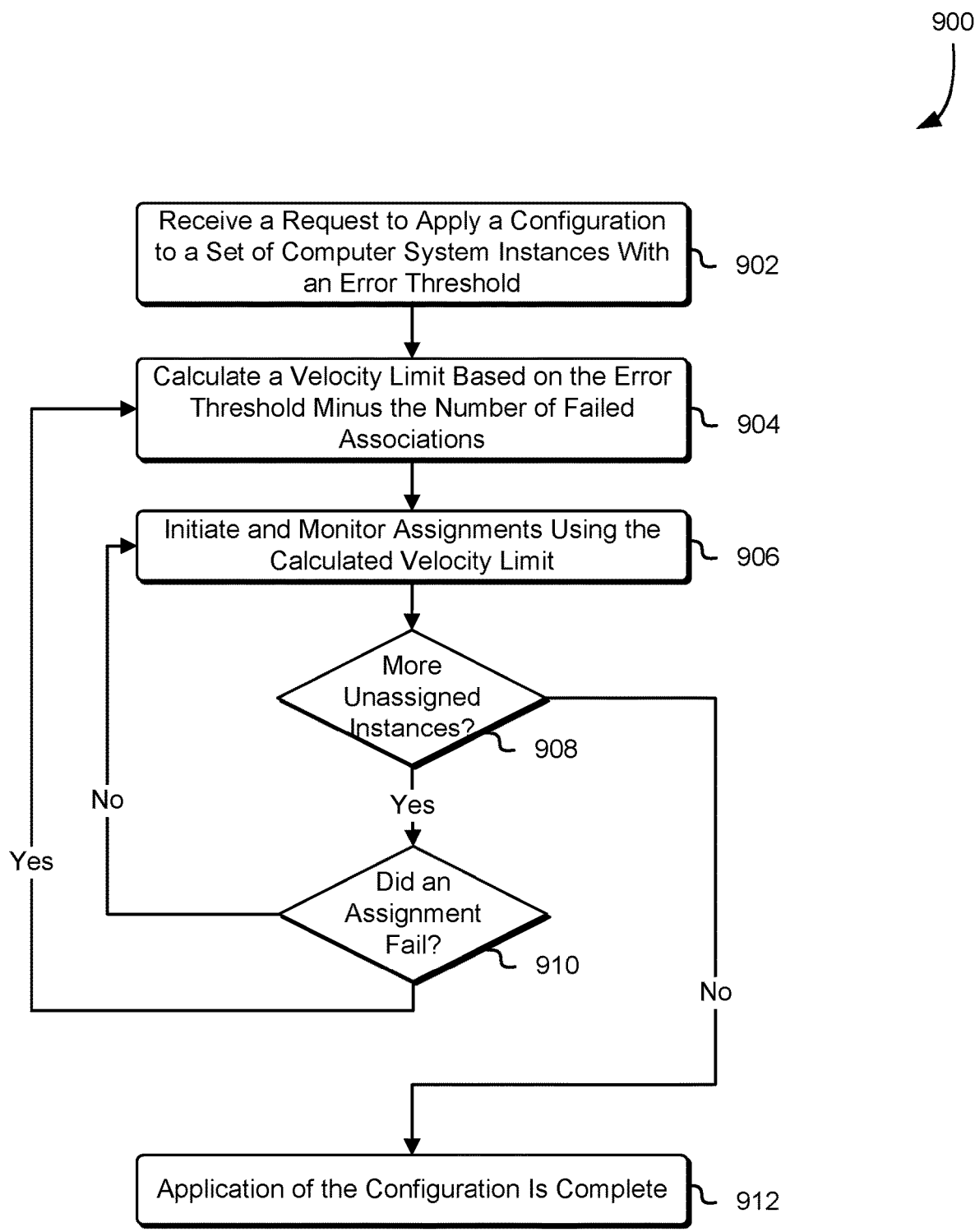
FIG. 9 shows an illustrative example of a process in accordance with one embodiment.

FIG. 9 shows an illustrative example of a process in accordance with one embodiment. A process diagram 900 illustrates an embodiment of a process that, if performed by a state management server, associates a configuration with a set of virtual computer system instances, in accordance with an error threshold and an implied velocity parameter. In an embodiment, the process begins at block 902 with a state management server receiving a request to apply configuration to a set of computer system instances using a particular error threshold. In an embodiment, at block 904, the state management server calculates a velocity limit from the error threshold by determining the number of failed configurations in the current interval and subtracting the number of failed configurations from the error threshold.

In an embodiment, at 906, the state management server initiates the application of the configuration to computer systems and the set of computer systems in accordance with the determined velocity limit. In an embodiment, at block 908, the state management server determines whether the configuration has been applied to all the computer systems in the set of computer systems. If the configuration has been applied to all of the computer systems in the set of computer systems, execution proceeds to block 912 and the configuration process is complete. If there are additional computer systems to be configured, execution advances to decision block 910 where the state management server determines if any of the attempts to configure computer systems failed. If there were no failures, execution returns to block 906 and the state management server initiates additional assignments of the configuration in accordance with the previously calculated velocity limit.

In an embodiment, if any of the computer systems did not have the configuration successfully applied, execution proceeds from decision block 910 to block 904, where an updated velocity limit is calculated based on the updated number of failed associations. In an embodiment, execution then proceeds to block 906 where a number of additional computer systems in the set of computer systems are configured in accordance with the new velocity limit. In this way, the velocity limit is adjusted downward as the number of errors increases, thereby preventing the state management server from generating configuration errors in excess of the error threshold.

Figure 10:
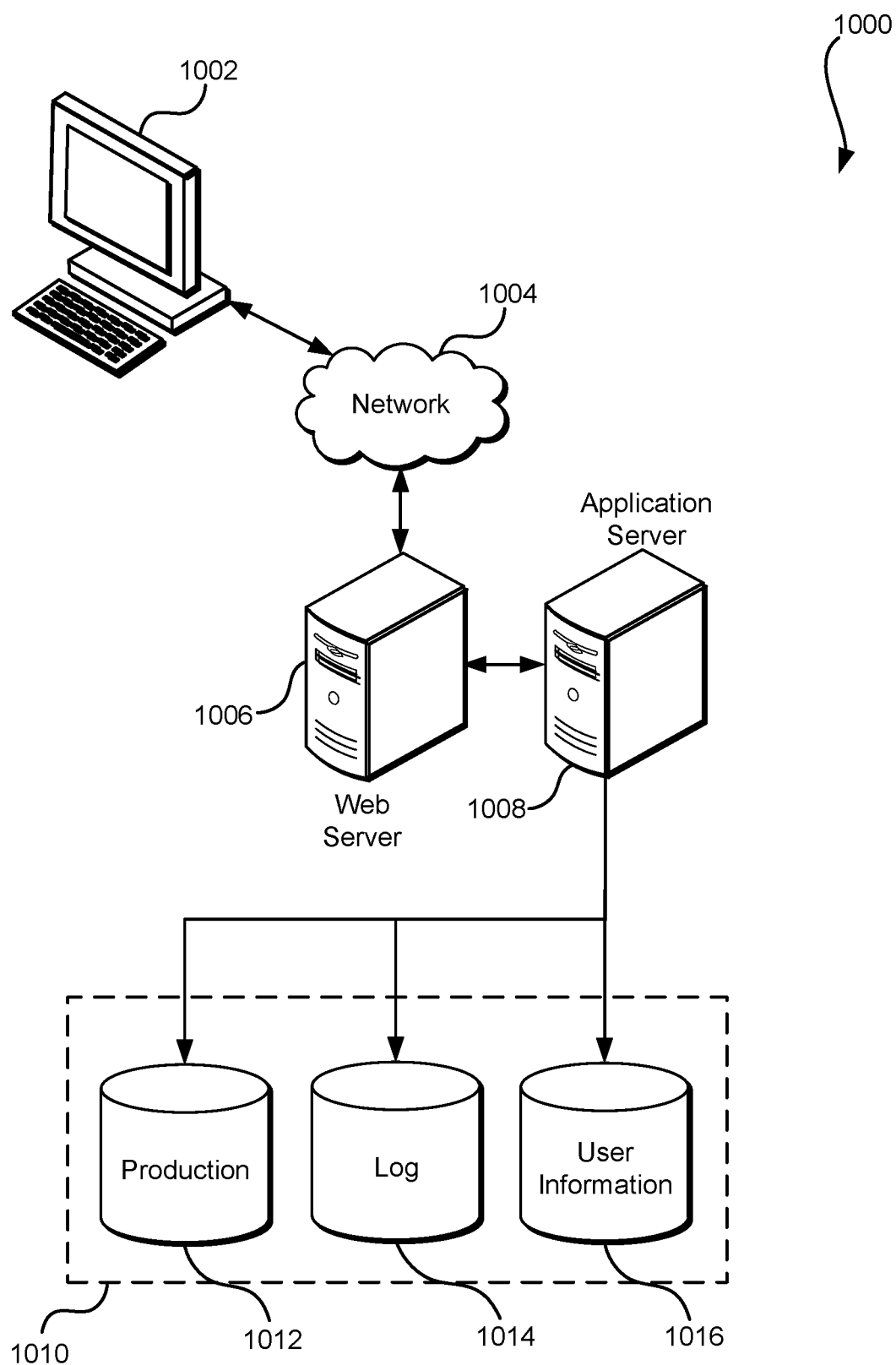
FIG. 10 shows an illustrative example of a system in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain an embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request to apply a configuration to a group of virtual computer system instances, the request specifying a limit on the number of configurations that can be concurrently in process of being applied and a limit on the number of failed configuration applications;
   applying the configuration to the group of virtual computer system instances in accordance with the specified limit on the number of configurations that can be concurrently applied such that no more than the specified limit of computer systems are in the process of being configured while applying the configuration to the group of virtual computer system instances; and
   stopping applying the configuration to the group of virtual computer system instances as a result of determining that at least the limit on the number of failed configuration applications has been met.

2. The computer-implemented method of claim 1, wherein:
   a tag is provided with the request; and
   the group of virtual computer system instances is determined by identifying individual virtual computer system instances that are associated with the tag.

3. The computer-implemented method of claim 2, wherein the configuration specifies a security policy to apply, a software package to install, an amount of memory or processing capacity to be allocated, or an operating system patch to be applied to each virtual computer system instance in the group of virtual computer system instances.

4. The computer-implemented method of claim 1, wherein, while the configuration is being applied to the group of virtual computer system instances, the limit on the number of configurations that can be concurrently applied is reduced based at least in part on the number of failed configuration applications.

5. A system, comprising:
   one or more processors; and
   memory that stores computer-executable instructions that, if executed, cause the one or more processors to:
      obtain a request to apply a configuration to a group of computer system instances;
      apply the configuration to the group of computer system instances in accordance with a limit on the number of configurations that can be concurrently applied;
      stop applying the configuration to the group of computer system instances as a result of determining that at least a threshold number of configuration applications failed;
      indicate that the request failed; and
      indicate a set of computer systems that were associated with configuration failures.

6. The system of claim 5, wherein the group of computer system instances is a group of virtual computer system instances.

7. The system of claim 6, wherein the configuration is applied to a virtual computer system instance in the group of computer system instances by modifying an image file associated with the virtual computer system instance.

8. The system of claim 5, wherein the computer-executable instructions further cause the system to determine the limit on the number of configurations that can be concurrently applied based at least in part on a difference between a quantity of failed configuration applications and the threshold.

9. The system of claim 6, wherein the computer-executable instructions further cause the system to:
   determine that application of the configuration to a computer system has failed; and
   as a result of determining that the application of the configuration to a computer system has failed, reduce the limit on the number of configurations that can be concurrently applied.

10. The system of claim 5, wherein the computer-executable instructions further cause the system to:
    determine the number of configurations that can be concurrently applied as a percentage of the group of computer system instances.

11. The system of claim 5, wherein stopping applying the configuration to the group of computer system instances is accomplished at least in part by:
    aborting the configuration of computer system instances that are being configured at a time that the threshold number of configuration applications failed; and
    indicating a set of computer system instances of the group of computer system instances that are not configured.

12. The system of claim 5, wherein the computer-executable instructions further cause the system to:
    indicate a set of computer systems for which configuration was incomplete; and
    indicate a set of computer systems for which configuration was successful.

13. A non-transitory computer-readable storage medium storing executable instructions that, as a result of being executed by one or more processors of a computer system, cause the computer system to at least:
    obtain a request to apply a configuration to a group of computer system instances;
    apply the configuration to the group of computer system instances in accordance with a limit on the number of configurations that can be concurrently applied, while ensuring that no more than a threshold quantity of computer systems are unavailable for use; and
    stop applying the configuration to the group of computer system instances as a result of determining that at least the threshold number of configuration applications failed.

14. The non-transitory computer-readable storage medium of claim 13, wherein the group of computer system instances is a group of virtual computer system instances.

15. The non-transitory computer-readable storage medium of claim 13, wherein the configuration is applied by modifying an image file associated with a virtual computer system in the group of computer system instances.

16. The non-transitory computer-readable storage medium of claim 13, wherein the executable instructions further comprise instructions that, as a result of being executed by the one or more processors, cause the computer system to reduce the number of configurations that can be concurrently applied based at least in part on a quantity of failed configuration applications.

17. The non-transitory computer-readable storage medium of claim 13, wherein the request identifies the group of computer system instances by identifying one or more tags associated with each individual computer system instance in the group of computer system instances.

18. The non-transitory computer-readable storage medium of claim 13, wherein:

the request identifies the group of computer system instances by identifying a logical relationship between a plurality of tags; and each individual computer system in the group of computer system instances is associated with a set of tags that satisfies the logical relationship.

19. The non-transitory computer-readable storage medium of claim 13, wherein the threshold quantity is based on a velocity parameter provided with the request.

20. The non-transitory computer-readable storage medium of claim 13, wherein the executable instructions further comprise instructions that, as a result of being executed by the one or more processors, cause the computer system to reapply the configuration to the group of computer system instances based at least in part on a schedule provided with the request.

* * * * *